(12) United States Patent
Martin

(10) Patent No.: US 6,823,975 B2
(45) Date of Patent: Nov. 30, 2004

(54) AIR-COOLED CENTRIFUGAL CLUTCH WITH AIR IMPELLER PLATE

(75) Inventor: William A. Martin, Sun City, CA (US)

(73) Assignee: Horstman Manufacturing Co., Inc., Vista, CA (US)

( * ) Notice: Subject to any disclaimer, the term of this patent is extended or adjusted under 35 U.S.C. 154(b) by 0 days.

(21) Appl. No.: 10/242,280

(22) Filed: Sep. 12, 2002

(65) Prior Publication Data

US 2004/0050645 A1 Mar. 18, 2004

(51) Int. Cl.$^7$ ............................ F16D 43/08; F16D 13/72
(52) U.S. Cl. ............................ 192/105 C; 192/113.23; 192/113.26
(58) Field of Search ..................... 192/105 C, 113.23, 192/113.26, 70.12

(56) References Cited

U.S. PATENT DOCUMENTS

| | | | |
|---|---|---|---|
| 1,635,353 A | | 7/1927 | Alley |
| 2,020,748 A | * | 11/1935 | Waseige .................. 192/70.12 |
| 2,095,094 A | * | 10/1937 | Glasner ................. 192/113.23 |
| 2,107,954 A | * | 2/1938 | Morton et al. .......... 192/113.26 |
| 2,205,629 A | | 6/1940 | Peterson |
| 2,487,936 A | * | 11/1949 | McCrady et al. ...... 192/113.23 |
| 2,581,637 A | | 1/1952 | Danly et al. |
| 2,675,106 A | * | 4/1954 | Foster ................... 192/113.23 |
| 3,469,664 A | * | 9/1969 | Ortlinghaus et al. ... 192/113.23 |
| 3,506,101 A | | 4/1970 | Fey |
| 3,667,581 A | * | 6/1972 | Hanks .................... 192/113.23 |
| 4,111,291 A | * | 9/1978 | Horstman ............... 192/105 C |
| 4,139,085 A | | 2/1979 | Kanbe et al. |
| 4,294,343 A | * | 10/1981 | Reh ....................... 192/113.23 |
| 4,667,794 A | * | 5/1987 | Martinez-Corral et al. ...... 192/70.12 |
| 5,279,182 A | | 1/1994 | Fukushima |
| 5,421,438 A | | 6/1995 | Flotow et al. |
| 5,427,212 A | * | 6/1995 | Shimazu et al. ........ 192/113.23 |
| 5,857,547 A | | 1/1999 | Dequesnes |
| 6,129,191 A | | 10/2000 | Kummer et al. |
| 6,352,147 B1 | * | 3/2002 | Orlamunder et al. .. 192/113.26 |

* cited by examiner

Primary Examiner—Rodney H. Bonck
(74) Attorney, Agent, or Firm—Fulwider Patton Lee & Utecht, LLP

(57) ABSTRACT

The centrifugal clutch includes one or more clutch plates having a plurality of air impeller vanes to circulate air through the centrifugal clutch during its operation in order to extend the useful life of the clutch. A pressure plate includes a plurality of air impeller vanes formed by alternating raised impeller vane portions and impeller vane channels, with the weighted levers of the centrifugal clutch aligned with the raised portions of the air impeller vanes of the pressure plate. A fixed plate may also include a plurality of air impeller vanes formed on a side surface of the fixed plate by alternating raised impeller vane portions and impeller vane channels. A floating plate may also include a plurality of air impeller channels formed internally within the floating plate and having openings at the outer and inner edges of the floating plate.

16 Claims, 3 Drawing Sheets

AIR-COOLED CENTRIFUGAL CLUTCH WITH AIR IMPELLER PLATE

BACKGROUND OF THE INVENTION

This invention relates generally to friction clutches, and more particularly relates to centrifugal clutches in which the frictional elements engage at a predetermined speed of rotation of a power shaft.

Centrifugal friction clutches which engage at a predetermined rotational speed are particularly useful in combination with internal combustion engines which tend to stall under starting load conditions, by delaying engagement until the engine is operating at a sufficiently high speed to produce enough torque to prevent stalling. One such centrifugal clutch includes a number of plates and discs which move into frictional engagement by pressure exerted by pivoting of weights arranged next to the plates and discs. Such centrifugal friction clutches are also particularly useful in connection with small displacement internal combustion engines such as are used in go-carts, a demanding application of such a clutch in which any unnecessary size and weight can be a disadvantage. Centrifugal clutches are also known in automatic multispeed transmissions, but such transmissions add a considerable amount of size and weight to a small vehicle, and go-carts or one-quarter midget racing vehicles typically are not equipped with transmissions. It is therefore necessary for the clutch to be continually engaged and disengaged.

During normal operation of such a centrifugal clutch, the temperature of the plates can become extremely high, which commonly leads to unnecessary wear, deterioration and warping of the clutch components, requiring frequent replacement of clutch components. For example, during constant operation, the friction plates of such a clutch will often need to be replaced every hour. In order to combat the problem of excessive heating of a clutch, one conventional type of friction clutch utilizes a pressure ring which includes vanes formed on one face of the pressure ring for circulating air through the clutch. Another friction clutch includes a flywheel with vanes for circulating air through the clutch, and air flow fins or guides that may be secured to a supporting plate. In another conventional clutch, a pressure plate is provided with vanes for air cooling of the clutch. It would be desirable to provide one or more plates of an air cooled centrifugal clutch with air impeller vanes. In particular, it is desirable to provide a front pressure plate of a centrifugal clutch with air impeller vanes, but such air impeller vanes can interfere with the operation of weighted levers of the centrifugal clutch. Accordingly, the present invention meets these and other needs.

SUMMARY OF THE INVENTION

Briefly, and in general terms, the present invention provides for a centrifugal clutch with one or more clutch plates having a plurality of air impeller vanes to circulate air through the centrifugal clutch during its operation in order to extend the useful life of the clutch.

The present invention accordingly provides for an improved centrifugal clutch for transmission of torque from a rotating input connector for supplying rotational power to an output connector receiving the rotational power, the centrifugal clutch having frictional surfaces adapted to be engaged at a predetermined engagement speed of rotation of the input connector. The centrifugal clutch includes a cylindrical housing drum having a plurality of slots, and a plurality of clutch plates disposed within the cylindrical housing drum operatively engaged with the input connector.

A centrifugal force lever support plate having a plurality of apertures therein is disposed within the cylindrical housing drum, and a pressure plate having a contact friction side and an opposing side, which is disposed within the cylindrical housing drum with the opposing side of the pressure plate adjacent to the centrifugal force lever support plate. The centrifugal force lever support plate is operatively engaged with the input connector, and includes means for applying an adjustable biasing force on the pressure plate toward the centrifugal force lever support plate. The centrifugal force lever support plate also includes a plurality of centrifugal force levers symmetrically disposed on and pivotally attached to the centrifugal force lever support plate, with each of the centrifugal force levers biasing the pressure plate toward the cylindrical housing drum due to centrifugal force exerted on the centrifugal force levers during rotation of the centrifugal force lever support plate. One or more clutch disks are disposed within the cylindrical housing drum adjacent to the pressure plate, with each clutch disk having a plurality of flanges engaging the plurality of slots of the cylindrical housing drum, respectively, and a floating plate may also be provided adjacent to the one or more clutch disks. A fixed plate having a friction contact side is disposed within the cylindrical housing drum between the one or more clutch disks and the cylindrical housing drum, with a friction contact side of the fixed plate disposed adjacent to the one or more clutch disks. A drive hub mounted to the fixed plate is disposed within the cylindrical housing drum, and engages the input connector.

In one aspect, the pressure plate includes a plurality of air impeller vanes formed by alternating raised impeller vane portions and impeller vane channels, with the weighted levers of the centrifugal clutch aligned with the raised portions of the air impeller vanes of the pressure plate. In another aspect, the floating plate may also include a plurality of air impeller channels formed internally within the floating plate and having openings at the outer and inner edges of the floating plate. In another aspect, the fixed plate may also include a plurality of air impeller vanes formed on the side of the fixed plate opposing the friction surface of the fixed plate by alternating raised impeller vane portions and impeller vane channels.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
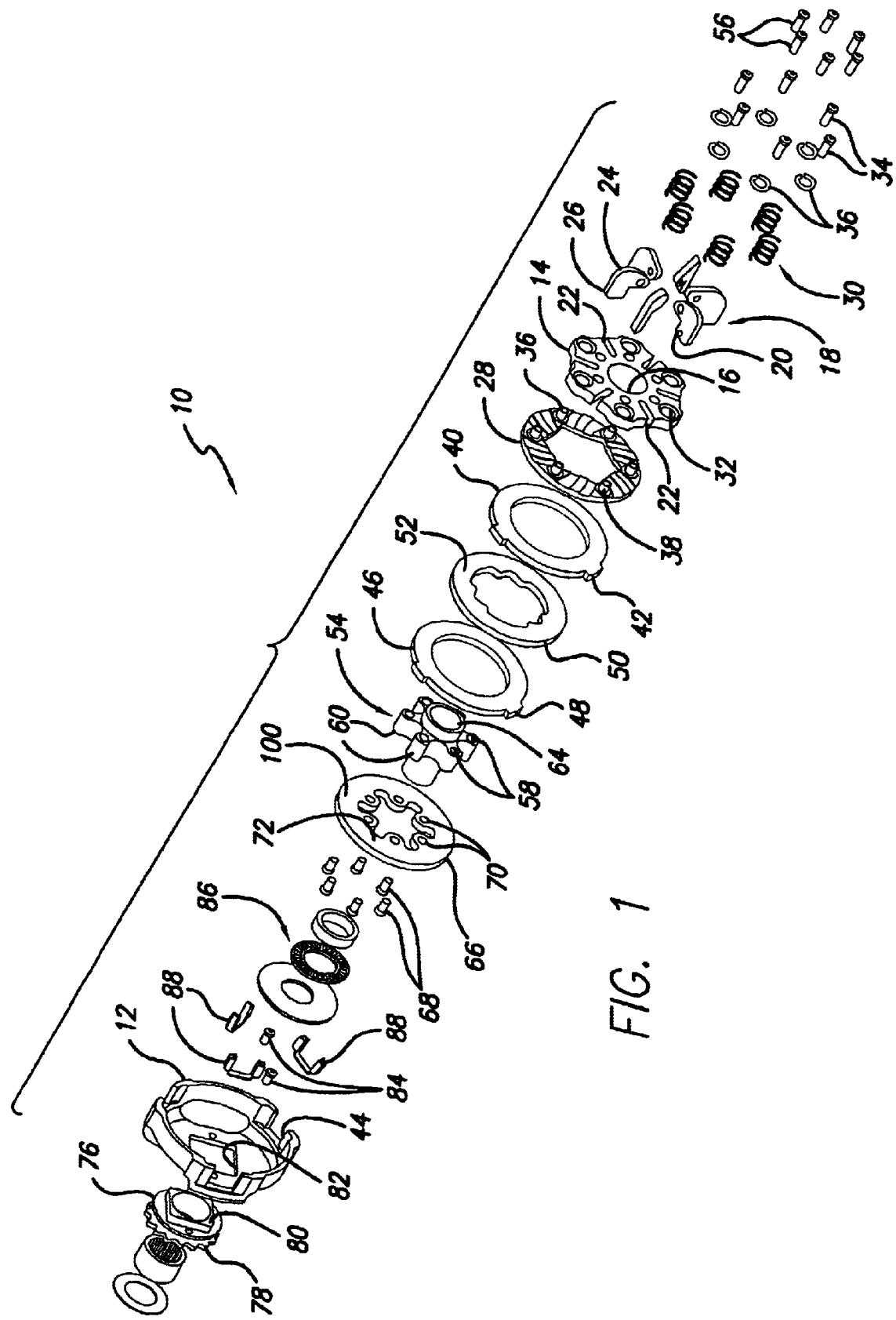
FIG. 1 is an exploded perspective view of a centrifugal clutch according to the invention, shown separated from a power takeoff shaft from an engine of a vehicle.

As is illustrated in the drawings, the invention is embodied in a centrifugal clutch 10 that is contained in a generally cylindrical housing drum 12 of the clutch, allowing for transmission of torque from a power input connector such as a power takeoff shaft, for supplying rotational power to an output drive connector, such as a drive hub. The cylindrical drum is preferably coaxially aligned with and surrounds the clutch plates and the clutch disks, with the drum interlocking with the clutch disks, as will be further explained below. As is shown in FIG. 1, the centrifugal clutch includes a generally circular centrifugal force lever support plate 14, typically formed from cast aluminum, and having a central opening 16 allowing the power takeoff shaft to pass therethrough, with a small amount of clearance. Means for applying an adjustable biasing force on the centrifugal force lever support plate towards the clutch disk and the pressure plate, described below, are provided, such as a plurality of centrifugal force levers 18, typically arranged symmetrically about the centrifugal force lever support plate, and having pivot pins 20 mounting each of the centrifugal force levers into corresponding slots 22 of the centrifugal force lever support plate, for example. Other means for mounting the centrifugal force levers on the support plate such as apertures in the centrifugal force levers and a corresponding snap ring retained on the support plate, may also be used. The centrifugal force levers are each preferably made of a plurality of flat parallel leaves arranged perpendicular to the plane of the support plate, and include a drive portion 24 generally to one side of the pivot pins, having the major portion of mass of the force lever, and a radius 26 or cam portion generally on the other side of the aperture, so that as the force levers rotate, the centrifugal force of the drive portion of the force levers urges the radius against a generally flat, circular pressure plate 28.

The means for applying an adjustable biasing force on the support plate towards the clutch disk and the pressure plate, such as by operatively engaging the pressure plate with the centrifugal force lever support plate, in one presently preferred embodiment also comprises a plurality of compression springs 30 placed in countersunk openings 32 in the centrifugal force lever support plate, held in place by a combination of stall speed adjusting screws or spring adjusters 34 and washers 36, screwed in corresponding internally threaded cylindrical stems 38 formed in the pressure plate. The clutch also includes frictional surfaces adapted to be engaged at a predetermined engagement speed of rotation of the power input connector, such as a first clutch disk 40 having friction liners attached to both faces of the clutch disk, and having a plurality of flanges 42 that interlock with openings or slots 44 of the cylindrical housing drum that permit air cooling of the clutch. A second clutch disk 46 may also be provided, having friction liners attached to both faces of the clutch disk, and having a plurality of flanges 48 that also interlock with the slots 44 of the cylindrical housing drum. A floating plate 50 may also be provided between the two clutch disks. The clutch disks are preferably coaxially aligned with the centrifugal force lever support plate, the floating plate and the pressure plate. The clutch disks are adapted to smoothly engage the pressure plate and the friction surfaces 52 (only one of which is shown) of the floating plate.

A main drive support member or drive hub 54 conforms to and fits over a power takeoff shaft (not shown) that typically extends axially through the clutch from an engine (not shown). The drive hub is mounted to the centrifugal force lever support plate by screws or bolts 56 extending through apertures 58 in rounded flanges 60 of the drive hub. The power takeoff shaft engages the tubular shaft 64 of the drive hub, and input power is supplied to the clutch by the power takeoff shaft of an engine. A back plate or fixed plate 66 is also provided, mounted by screws or bolts 68 through apertures 70 in the fixed plate to the centrifugal force lever support plate 14, with slots 72 of the fixed plate engaged with the rounded flanges 60 of the drive hub.

In order to provide an output connector of the torque transmitted through the fixed plate and clutch plates to the cylindrical housing drum of the centrifugal clutch, a sprocket 76, having a plurality of splines 78, includes a raised rectangular key portion 80 that engages rectangular slot 82 of the back face of the cylindrical housing drum of the centrifugal clutch, and is mounted to the back face of the cylindrical housing drum by bolts or screws 84. Additional plates 86 are provided for coupling the drive hub to the cylindrical housing drum. Generally U-shaped wear clips 88, typically formed from a wear-resistant material, such as carbon steel or aluminum, may also be mounted in the slots 44 of the cylindrical housing drum.

In one aspect of the invention, at least one of the clutch plates of the centrifugal clutch is provided with air impeller vanes for air cooling of the centrifugal clutch. Larger, more massive clutch plates provide a better heat sink for the high temperatures generated by the centrifugal clutch, but particularly where weight reduction is important, as in go-cart racing, for example, the use of one or more clutch plates with air impeller vanes provides sufficient cooling to allow for a significant reduction in the size and mass of the clutch plates. For example, while clutch plates that are 3.5 inches in diameter provide for a better heat sink than clutch plates that are 3.25 inches in diameter, the reduction in heat sink capacity of the smaller clutch plates is compensated for by improving the cooling of the centrifugal clutch by providing at least one of the clutch plates with air impeller vanes. It has been found that performance of centrifugal clutches provided with air impeller vanes on at least one of the clutch plates compares favorably to the performance of conventional centrifugal clutches, and that components of centrifugal clutches provided with air impeller vanes on at least one of the clutch plates generally last longer and incur less wear.

Figure 3:
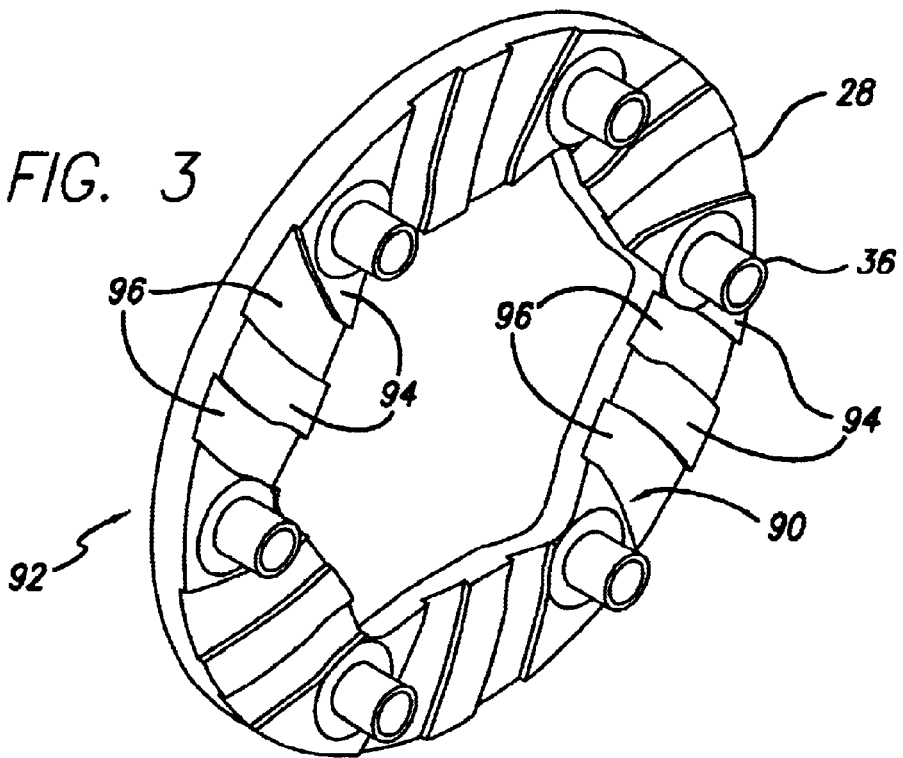
FIG. 3 is an enlarged view of the pressure plate of FIG. 1, showing the air impeller vanes formed on the side of the pressure plate opposing the friction surface of the pressure plate.

Referring to FIGS. 1 and 3, the pressure plate may be provided with a plurality of air impeller vanes on the side 90 of the pressure plate opposing the contact friction side 92 of the pressure plate adjacent to the clutch disk 40. The plurality of air impeller vanes of the pressure plate are formed by a plurality of alternating raised impeller vane portions 94 and impeller vane channels 96, typically curving or spiraling radially outward, so as to cause air to circulate within the centrifugal clutch to cool the centrifugal clutch. The raised impeller vane portions form thicker, reinforced portions that serve as stiffening ribs for the pressure plate. The weighted levers of the centrifugal clutch aligned with and pressing against the raised portions of the air impeller vanes of the pressure plate so as to cause the weighted levers to press against the thicker, reinforced raised portions of the pressure plate with minimal deformation of the pressure plate.

Figure 2:
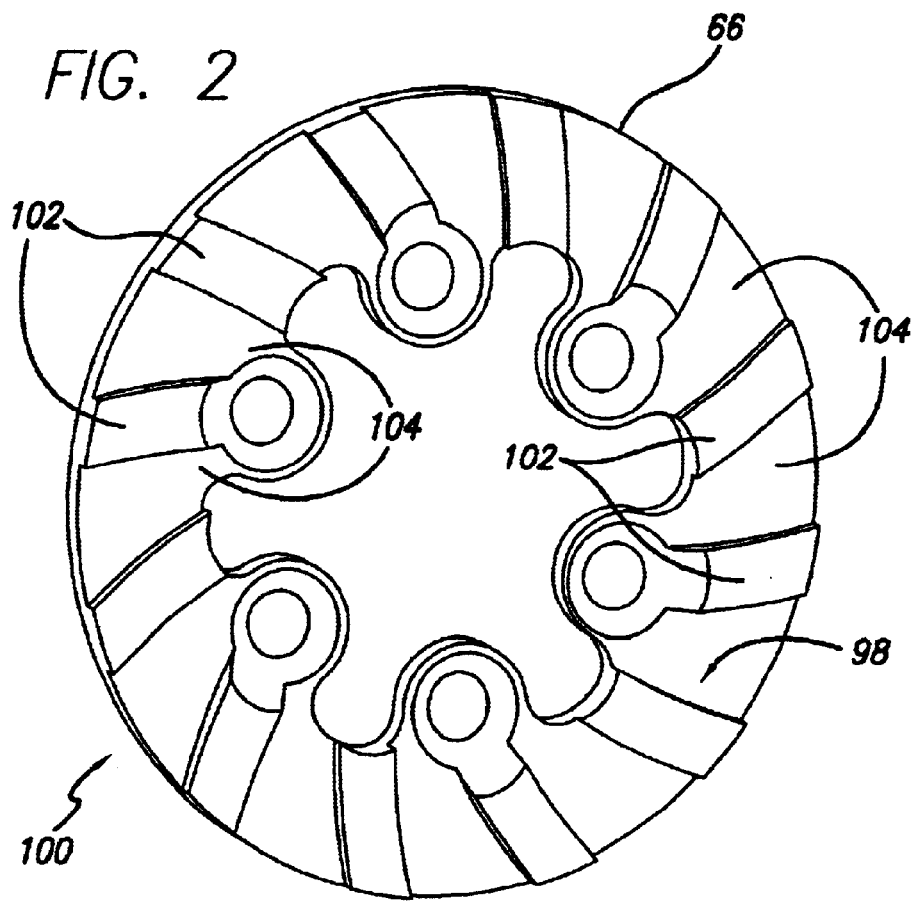
FIG. 2 is an enlarged view of the back or fixed plate of FIG. 1, showing the air impeller vanes formed on the side of the fixed plate opposing the friction surface of the fixed plate.

Referring to FIGS. 1 and 2, the back or fixed plate may be provided with a plurality of air impeller vanes on the side 98 of the fixed plate opposing the contact friction side 100 of the fixed plate adjacent to the clutch disk 46. The plurality of air impeller vanes of the fixed plate are formed by a plurality of alternating raised impeller vane portions 102 and impeller vane channels 104, typically curving radially outward in a spiral as shown in FIG. 2, so as to cause air to circulate within the centrifugal clutch to cool the centrifugal clutch.

Figure 4:
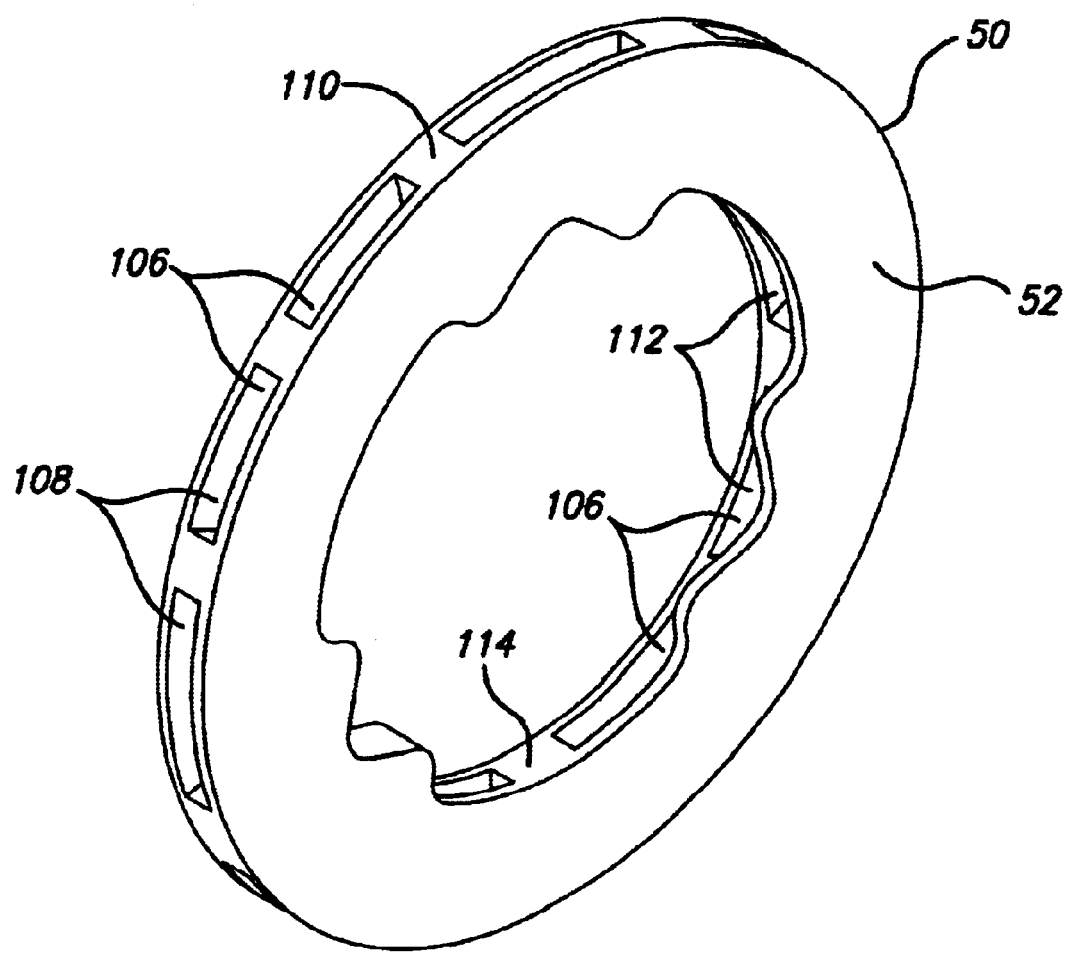
FIG. 4 is an enlarged view of the floating plate of FIG. 1, showing the internal air impeller channels of the floating plate.

Referring to FIG. 4, the floating plate may also include a plurality of air impeller channels 106 formed internally and typically curving radially outwardly within the floating plate and having openings 108 at the outer edge 110 of the floating plate and openings 112 at the inner edge 114 of the floating plate, so as to cause air to circulate within the centrifugal clutch to cool the centrifugal clutch.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In a centrifugal clutch for transmission of torque from a rotating input connector for supplying rotational power to an output connector for receiving the rotational power, the centrifugal clutch having frictional surfaces adapted to be engaged at a predetermined engagement speed of rotation of said input connector, the centrifugal clutch including a cylindrical housing drum, a pressure plate disposed within said cylindrical housing drum, a centrifugal force lever support plate disposed within said cylindrical housing drum adjacent to said pressure plate, the centrifugal force lever support plate being operatively engaged with the input connector, means for applying an adjustable biasing force on the pressure plate toward the centrifugal force lever support plate, a plurality of centrifugal force levers symmetrically disposed on and pivotally attached to said centrifugal force lever support plate, at least one clutch disk disposed within said cylindrical housing drum adjacent to the pressure plate, respectively, and a fixed plate disposed within the cylindrical housing drum between the at least one clutch disk and the cylindrical housing drum, and a drive hub disposed within the cylindrical housing drum and engaging the input connector, the drive hub being mounted to the fixed plate, the improvement in the centrifugal clutch comprising:

the pressure plate having a contact friction side and an opposing side, and a plurality of air impeller vanes being formed on said opposing side of said pressure plate by a plurality of alternating raised impeller vane portions and impeller vane channels, with the weighted levers of the centrifugal clutch aligned with the raised portions of the air impeller vanes, so as to cause the weighted levers to press against the raised portions of the air impeller vanes; and said at least one clutch disk including a floating plate having an outer edge and an inner edge, said floating plate including a plurality of air impeller channels formed internally within the floating plate and having openings at the outer and inner edges of the floating plate.

2. The centrifugal clutch of claim 1, wherein said plurality of air impeller vanes of the pressure plate curve radially outward so as to thereby cause air to circulate within the centrifugal clutch to cool the centrifugal clutch during operation of the centrifugal clutch.

3. The centrifugal clutch of claim 1, wherein the fixed plate has a contact friction side and an opposing side, and the fixed plate comprises a plurality of air impeller vanes formed on said opposing side by alternating raised impeller vane portions and impeller vane channels.

4. The centrifugal clutch of claim 3, wherein said plurality of air impeller vanes of the fixed plate curve radially outward so as to thereby cause air to circulate within the centrifugal clutch to cool the centrifugal clutch during operation of the centrifugal clutch.

5. The centrifugal clutch of claim 1, wherein said plurality of air impeller vanes of the floating plate curve radially outward so as to thereby cause air to circulate within the centrifugal clutch to cool the centrifugal clutch during operation of the centrifugal clutch.

6. A centrifugal clutch for transmission of torque from a rotating input connector for supplying rotational power to an output connector for receiving the rotational power, the centrifugal clutch having frictional surfaces adapted to be engaged at a predetermined engagement speed of rotation of said input connector, the centrifugal clutch comprising:

a cylindrical housing drum;

a pressure plate disposed within said cylindrical housing drum, the pressure plate having a contact friction side and an opposing side, and a plurality of air impeller vanes being formed on said opposing side of said pressure plate by a plurality of alternating raised impeller vane portions and impeller vane channels;

a centrifugal force lever support plate disposed within said cylindrical housing drum adjacent to said pressure plate, the centrifugal force lever support plate being operatively engaged with the input connector;

means for applying an adjustable biasing force on the pressure plate toward the centrifugal force lever support plate;

a plurality of centrifugal force levers symmetrically disposed on and pivotally attached to said centrifugal force lever support plate, with the centrifugal force levers of the centrifugal clutch aligned with the raised portions of the air impeller vanes, so as to cause the weighted levers to press against the raised portions of the air impeller vanes;

at least one clutch disk disposed within said cylindrical housing drum adjacent to the pressure plate, said at least one clutch disk including a floating plate having an outer edge and an inner edge, and wherein said floating plate comprises a plurality of air impeller channels formed internally within the floating plate and having openings at the outer and inner edges of the floating plate;

a fixed plate disposed within the cylindrical housing drum between the at least one clutch disk and the cylindrical housing drum, wherein the fixed plate has a contact friction side and an opposing side, and the fixed plate comprises a plurality of air impeller vanes formed on said opposing side by alternating raised impeller vane portions and impeller vane channels; and a drive hub disposed within the cylindrical housing drum and engaging the input connector, the drive hub being mounted to the fixed plate.

7. The centrifugal clutch of claim 6, wherein said plurality of air impeller vanes of the pressure plate curve radially outward so as to thereby cause air to circulate within the centrifugal clutch to cool the centrifugal clutch during operation of the centrifugal clutch.

8. The centrifugal clutch of claim 6, wherein said plurality of air impeller vanes of the fixed plate curve radially outward so as to thereby cause air to circulate within the centrifugal clutch to cool the centrifugal clutch during operation of the centrifugal clutch.

9. The centrifugal clutch of claim 6, wherein said plurality of air impeller vanes of the floating plate curve radially outward so as to thereby cause air to circulate within the centrifugal clutch to cool the centrifugal clutch during operation of the centrifugal clutch.

10. A centrifugal clutch for transmission of torque from a rotating input connector for supplying rotational power to an output connector for receiving the rotational power, the centrifugal clutch having frictional surfaces adapted to be engaged at a predetermined engagement speed of rotation of said input connector, the centrifugal clutch comprising:

a cylindrical housing drum;

a pressure plate disposed within said cylindrical housing drum, the pressure plate having a contact friction side and an opposing side;

a centrifugal force lever support plate disposed within said cylindrical housing drum adjacent to said pressure plate, the centrifugal force lever support plate being operatively engaged with the input connector;

means for applying an adjustable biasing force on the pressure plate toward the centrifugal force lever support plate;

a plurality of centrifugal force levers symmetrically disposed on and pivotally attached to said centrifugal force lever support plate;

at least one clutch disk disposed within said cylindrical housing drum adjacent to the pressure plate, said at least one clutch disk including a floating plate having an outer edge and an inner edge, and wherein said floating plate comprises a plurality of air impeller channels formed internally within the floating plate and having openings at the outer and inner edges of the floating plate;

a fixed plate disposed within the cylindrical housing drum between the at least one clutch disk and the cylindrical housing drum; and a drive hub disposed within the cylindrical housing drum and engaging the input connector, the drive hub being mounted to the fixed plate.

11. The centrifugal clutch of claim 10, wherein said pressure plate comprises a plurality of air impeller vanes formed on said opposing side of said pressure plate by a plurality of alternating raised impeller vane portions and impeller vane channels.

12. The centrifugal clutch of claim 11, wherein said centrifugal force levers of the centrifugal clutch are aligned with the raised portions of the air impeller vanes, so as to cause the weighted levers to press against the raised portions of the air impeller vanes.

13. The centrifugal clutch of claim 11, wherein said plurality of air impeller vanes of the pressure plate curve radially outward so as to thereby cause air to circulate within the centrifugal clutch to cool the centrifugal clutch during operation of the centrifugal clutch.

14. The centrifugal clutch of claim 10, wherein said fixed plate has a contact friction side and an opposing side, and the fixed plate comprises a plurality of air impeller vanes formed on said opposing side by alternating raised impeller vane portions and impeller vane channels.

15. The centrifugal clutch of claim 14, wherein said plurality of air impeller vanes of the fixed plate curve radially outward so as to thereby cause air to circulate within the centrifugal clutch to cool the centrifugal clutch during operation of the centrifugal clutch.

16. The centrifugal clutch of claim 10, wherein said plurality of air impeller vanes of the floating plate curve radially outward so as to thereby cause air to circulate within the centrifugal clutch to cool the centrifugal clutch during operation of the centrifugal clutch.

* * * * *